(12) United States Patent
Chen et al.

(10) Patent No.: US 12,008,202 B2
(45) Date of Patent: Jun. 11, 2024

(54) TOUCH LIGHT-EMITTING MODULE HAVING HOLLOWED PORTION FOR INCAPSULATION RESIN AND MANUFACTURING METHOD THEREOF

(71) Applicant: LIGITEK ELECTRONICS CO., LTD., New Taipei (TW)

(72) Inventors: Yi-Wen Chen, New Taipei (TW); Wen-Chung Chou, New Taipei (TW); I-Hsin Tung, New Taipei (TW)

(73) Assignee: LIGITEK ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/315,944

(22) Filed: May 11, 2023

(65) Prior Publication Data

US 2023/0367427 A1 Nov. 16, 2023

Related U.S. Application Data

(60) Provisional application No. 63/341,041, filed on May 12, 2022.

(51) Int. Cl.
*G06F 3/042* (2006.01)

(52) U.S. Cl.
CPC .. *G06F 3/0421* (2013.01); *G06F 2203/04103* (2013.01); *G06F 2203/04108* (2013.01)

(58) Field of Classification Search
CPC ......... G06F 3/0421; G06F 2203/04103; G06F 2203/04108; H01L 33/58; H01L 33/483; H01L 33/52; H01L 23/3121; H01L 21/485; H05K 1/028; H05K 1/0274; H05K 3/284; F21V 3/12
See application file for complete search history.

(56) References Cited

U.S. PATENT DOCUMENTS

| | | | | |
|---|---|---|---|---|
| 2005/0000726 A1* | 1/2005 | Kimata | ................... | H05K 3/284 29/841 |
| 2007/0121326 A1* | 5/2007 | Nall | ........................ | F21V 3/12 362/294 |
| 2009/0186454 A1* | 7/2009 | Miyawaki | ............. | H01L 33/483 257/E21.502 |
| 2013/0176689 A1* | 7/2013 | Nishimura | .......... | H01L 23/3121 29/832 |

(Continued)

*Primary Examiner* — Richard J Hong
(74) *Attorney, Agent, or Firm* — MUNCY, GEISSLER, OLDS & LOWE, P.C.

(57) ABSTRACT

A touch light-emitting module and a manufacturing method thereof are disclosed. The touch light-emitting module includes a printed circuit board and a touch-control conductor. The printed circuit board has a top surface on which a touch-control IC and a luminous unit that is electrically connected are disposed. The touch-control conductor includes a hollowed portion. The touch-control conductor is coated, on the bottom thereof, with a conductive material to combine with the top surface of the printed circuit board, so that the touch-control IC and the luminous unit are located in the hollowed portion. An encapsulation resin is then injected into a space between the printed circuit board and the hollowed portion to complete encapsulation. As such, the present invention offers a simplified structure to achieve an effect of minimization, and also simplifies the manufacturing process and reduces the working time to thereby enhance the yield.

18 Claims, 16 Drawing Sheets

(56) References Cited

U.S. PATENT DOCUMENTS

| | | | |
|---|---|---|---|
| 2014/0190930 A1* | 7/2014 | Mayo | H05K 3/284 |
| | | | 264/254 |
| 2014/0355251 A1* | 12/2014 | Kahrs | H01L 33/58 |
| | | | 438/27 |
| 2016/0295702 A1* | 10/2016 | Heikkinen | H05K 1/028 |
| 2016/0345437 A1* | 11/2016 | Heikkinen | H05K 1/0274 |
| 2017/0294387 A1* | 10/2017 | Kawabata | H01L 21/485 |
| 2019/0021168 A1* | 1/2019 | Heikkinen | H05K 1/028 |
| 2019/0344704 A1* | 11/2019 | Gipson | H05K 3/284 |
| 2020/0378574 A1* | 12/2020 | Page | H01L 33/52 |

* cited by examiner

TOUCH LIGHT-EMITTING MODULE HAVING HOLLOWED PORTION FOR INCAPSULATION RESIN AND MANUFACTURING METHOD THEREOF

CROSS REFERENCE TO RELATED APPLICATIONS

This application claims priority of U.S. Provisional Application No. 63/341,041 filed on May 12, 2022 under 35 U.S.C. § 119(e), the entire contents of all of which are hereby incorporated by reference.

FIELD OF THE INVENTION

The present invention relates to a touch light-emitting module and a manufacturing method thereof, and more particular to a touch light-emitting module that has a simple structure and is easy to manufacture, and a method thereof.

BACKGROUND OF THE INVENTION

The vigorousness of development of technology and science brings touch controllability to more and more devices. Touching a touch-control conductor arranged on such a device makes an electronic component (such as a light-emitting diode) that is in electrical connection with the touch-control conductor capable of functions of changing the color and luminance of light.

For example, a known product structure 20 that is currently available in the market (as shown in FIGS. 5A and 5B) includes a luminous element 22, such as a light-emitting diode, which is soldered on a circuit board 21, and a carrying member 23 having a light-transmitting zone 231 is provided on the circuit board 21, such that the light-transmitting zone 231 corresponds to the luminous element 22. A groove 232 is formed on a top of the carrying member 23 along a circumference thereof for mounting a touch-control conductor 24.

To assemble and fix together the circuit board 21, the carrying member 23, and the touch-control conductor 24, fasteners 30 are applied to screw into aligned fastening holes 211, 233, 241 formed in the three components. One can appreciate that such a known product structure 20 is made up of multiple components, so the structure is complicated and the fabrication is time-consuming, resulting in low yield and high cost. It is worse when the circuit board 21, the carrying member 23, and the touch-control conductor 24 are fixed together by means of fasteners 30, so that the size of the known product structure 30 is so limited that minimization is impossible.

Thus, in view of the above, many aspects of the product structure of that type are not satisfactory.

SUMMARY OF THE INVENTION

An embodiment of the present disclosure relates to a touch light-emitting module and a manufacturing method thereof, in which conductive material is applied to combine a touch-control conductor that is formed with a hollowed portion with a printed circuit board, such that the hollowed portion corresponds to a touch-control IC and a luminous unit disposed on the printed circuit board. After completion of encapsulation, when a user's finger touches the touch-control conductor, the touch-control IC that detects a change of capacitance value generates and transmits out a signal to thereby control the luminous unit, and thus, compared to the known product structure, the touch light-emitting module according to the present invention involves fewer components so as to have a simple structure and does not require fastening and fixing by fasteners, and thus, an effect of minimization is realized and the manufacturing method indeed simplifies the process of production and reduces the working time to thereby improve the yield.

One aspect of present disclosure is directed to a touch light-emitting module, which comprises: a printed circuit board, the printed circuit board has a top surface on which a touch-control integrated circuit (IC) and at least one luminous unit in electrical connection with the touch-control IC are disposed; and a touch-control conductor, which is combined with the printed circuit board by means of a conductive material, the touch-control conductor being formed with a hollowed portion in which the touch-control IC and the luminous unit are located, the hollowed portion receiving an encapsulation resin to inject therein to form encapsulation of the touch light-emitting module.

In the above-described touch light-emitting module, the top surface of the printed circuit board is formed with a recessed portion that corresponds, in shape, to the hollowed portion, and the touch-control IC and the luminous unit are arranged in the recessed portion.

In the above-described touch light-emitting module, the recessed portion comprises a function zone on which the touch-control IC and the luminous unit are arranged and a circumferential groove that surrounds an outer circumference of the function zone.

In the above-described touch light-emitting module, a raised rib is arranged between the function zone and the circumferential groove.

In the above-described touch light-emitting module, the touch-control conductor is formed of a plurality of copper-foil layers and at least one insulator layer that is alternately stacked on each other, and the touch-control conductor comprises an electrically conductive body, the electrically conductive body being arranged to connect, in a direction of the stacking, at least two of the copper-foil layers and the insulator layer between the copper-foil layers to establish electrical connection between the copper-foil layers.

In the above-described touch light-emitting module, the touch-control conductor comprises a plurality of electrically conductive zones, and the electrically conductive zones are combined with the printed circuit board by the conductive material, the electrically conductive zones being in a state of non-contacting with each other.

In the above-described touch light-emitting module, the electrically conductive zones are formed of a plurality of copper-foil layers and at least one insulator layer that which alternately stacked on each other, and the electrically conductive zones comprise an electrically conductive body, the electrically conductive body being arranged to connect, in a direction of the stacking, at least two of the copper-foil layers and the insulator layer between the copper-foil layers to establish electrical connection between the copper-foil layers.

In the above-described touch light-emitting module, the touch-control conductor has a width of around 0.3-2 cm.

In the above-described touch light-emitting module, the touch-control conductor and the printed circuit board are arranged coaxially with each other, and a spacing distance of around 0.05-0.5 mm is formed between a sidewall of the recessed portion and a sidewall of the hollowed portion.

In the above-described touch light-emitting module, the printed circuit board comprises an outer flange that is formed as a stepped structure.

In the above-described touch light-emitting module, the top surface of the printed circuit board further comprises a logic control IC set in thereon, and the logic control IC is in electrical connection with the touch-control IC and the luminous unit.

In the above-described touch light-emitting module, a metallic pad is arranged on the touch-control conductor.

In the above-described touch light-emitting module, the touch light-emitting module further comprises an upper cover. The upper cover is mounted at the top of the touch-control conductor and electrically connected with the touch-control conductor. The edges of the upper cover extend beyond the perimeter of the touch-control conductor and the perimeter of the printed circuit board. The upper cover is formed with a through-hole. The through-hole communicates with the hollowed portion of the touch-control conductor, wherein in top view of the touch light-emitting module, the perimeter of the through-hole encloses the perimeter of hollowed portion.

In the above-described touch light-emitting module, the area of the bottom surface of the upper cover where the upper cover is not in contact with the touch conductor is provided with a plural of support members.

In the above-described touch light-emitting module, the touch light-emitting module further comprises a reflector case and a sensing electrode. The reflector case is mounted on the printed circuit board and cover the touch-control conductor. The sensing electrode is mounted on the reflector case and has a connecting portion. The reflector case and the sensing electrode respectively have a through-hole. The through-hole on the reflector case and the through-hole on the sensing electrode communicate with each other and are arranged such that the light from the luminous unit can pass therethrough and emit out from top of the touch light-emitting module.

Further, the present invention also provides a touch light-emitting module manufacturing method, which comprises: Disposing a touch-control IC and at least one luminous unit on a top surface of a printed circuit board; coating a conductive material on a bottom surface of a touch-control conductor that is formed with a hollowed portion for combination with the top surface of the printed circuit board such that the touch-control IC and the luminous unit are located in the hollowed portion; and injecting an encapsulation resin into a space between the printed circuit board and the hollowed portion to complete encapsulation.

In the above-described touch light-emitting module manufacturing method, the touch-control IC and the luminous unit are mounted on the top surface of the printed circuit board through a soldering operation, and the touch-control conductor and the printed circuit board are combined through an operation of reflow.

In the above-described touch light-emitting module manufacturing method, the printed circuit board has a width of around 0.3-2 cm.

In the above-described touch light-emitting module manufacturing method, the touch-control conductor is formed by alternately stacking a plurality of copper-foil layers and at least one insulator layer, and drilling is applied to at least two of the copper-foil layers and the insulator layer between the copper-foil layers to form an electrical conduction hole, which is then filled up with electroplating to form an electrically conductive body to electrically connect the copper-foil layers.

In the above-described touch light-emitting module manufacturing method, the touch-control conductor comprises a plurality of electrically conductive zones, and the conductive material is coated on the bottom of the electrically conductive zones and has the electrically conductive zones combined with the printed circuit board in a state of non-contacting with each other.

In summary, the present invention will be described below in detail with reference to specific embodiments and examples. The embodiments and examples described below are not provided to limit the scope of protection that the application pursues. Those having ordinary skills in the art may readily appreciate that a substantially identical result may be obtained even some nonessential parameters have been adjusted or modified.

DETAILED DESCRIPTION OF THE PREFERRED EMBODIMENTS

Embodiments of the present invention will be described below with reference to the drawings. The description is not intended to limit the implementation of the present invention and is instead provided as an example of the embodiment of the present invention.

Figure 1A:
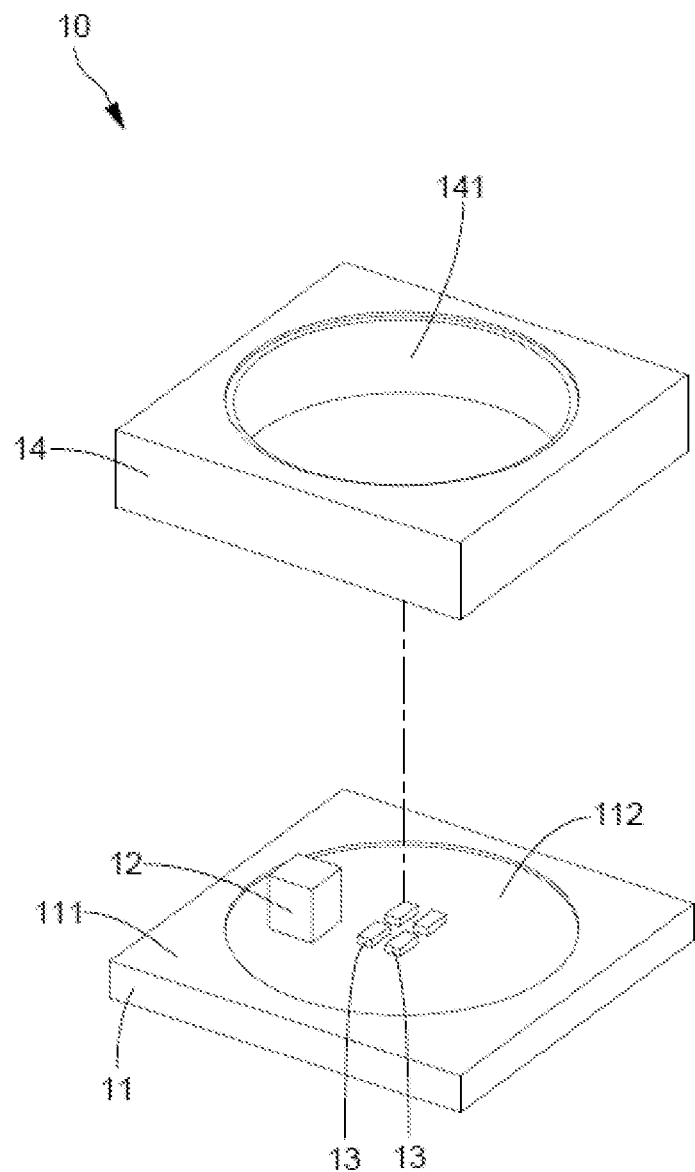
FIG. 1A is an exploded view showing a touch light-emitting module according to an embodiment of the present invention.
Figure 1B:
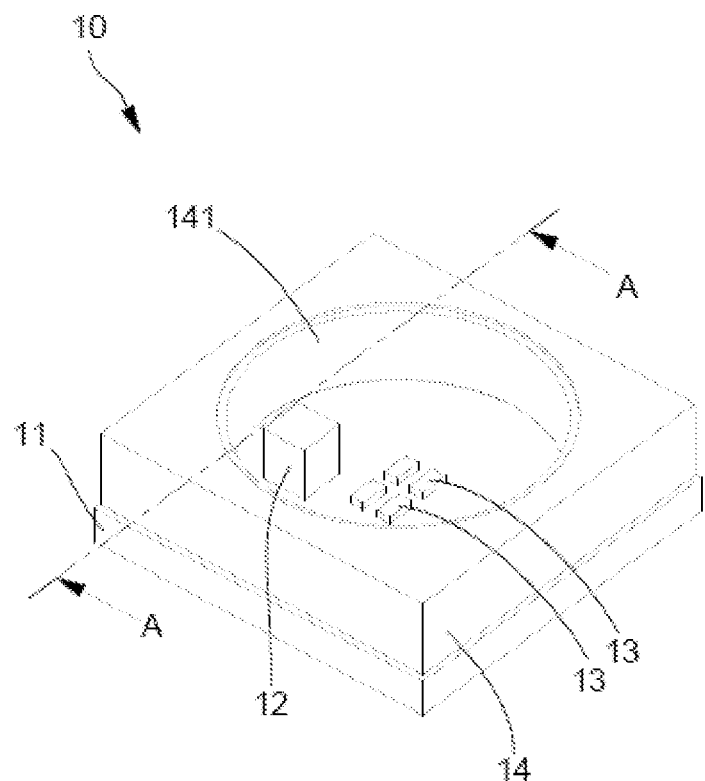
FIG. 1B is a perspective view showing a touch light-emitting module according to an embodiment of the present invention.
Figure 1C:
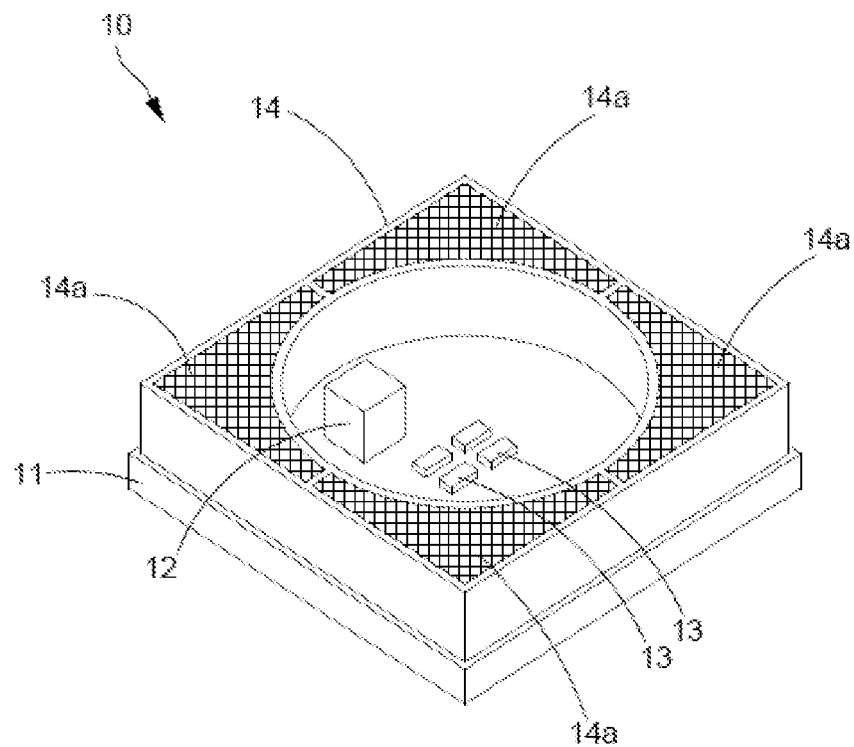
FIG. 1C is a perspective view showing a touch light-emitting module according to another embodiment of the present invention.
Figure 1D:
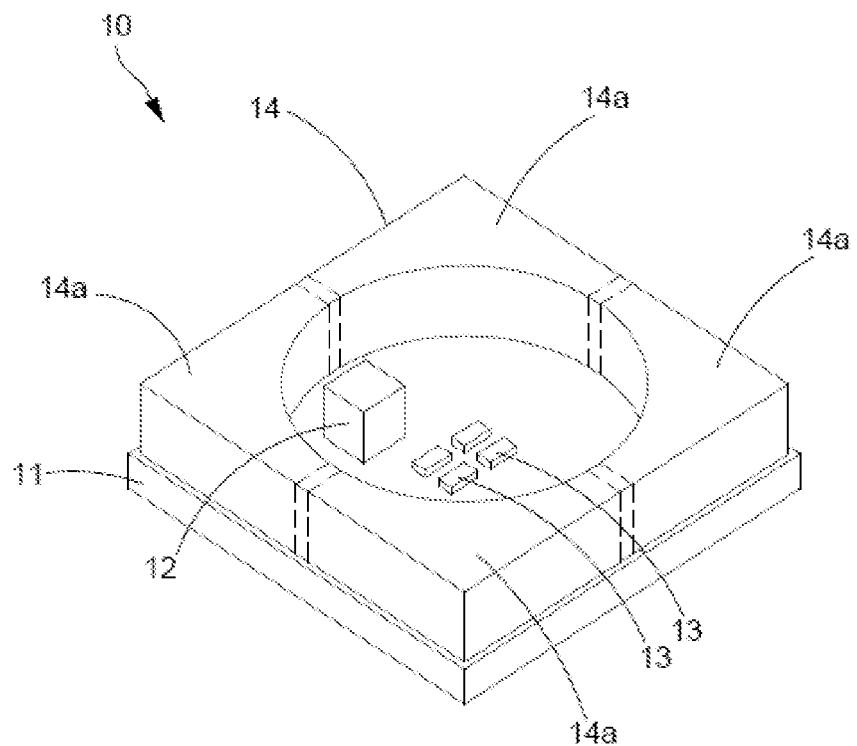
FIG. 1D is a perspective view showing a touch light-emitting module according to a further embodiment of the present invention.
Figure 2:
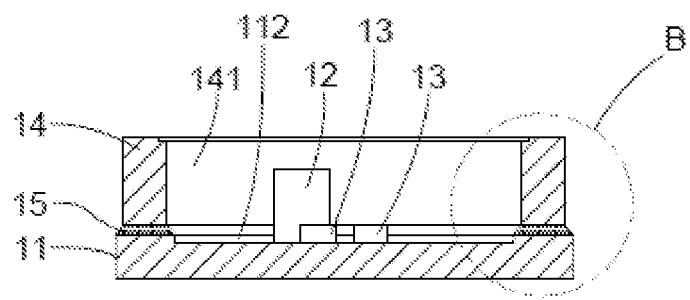
FIG. 2 is a cross-sectional view taken along the A-A line of FIG. 1B.

Firstly, referring to FIGS. 1A-2, the present invention provides a touch light-emitting module 10, which comprises: a printed circuit board 11, wherein the printed circuit board 11 has a top surface 111 on which a touch-control integrated circuit (IC) 12 and at least one luminous unit 13 electrically connected to the touch-control IC 12 are provided; and a touch-control conductor 14, which is combined to the printed circuit board 11 by means of conductive material 15, wherein the touch-control conductor 14 is formed with a hollowed portion 141 in which the touch-control IC 12 and the luminous unit 13 are received and the hollowed portion 141 receives an encapsulation resin (not shown) to inject therein for encapsulation of the touch light-emitting module 10. Thus, when a user uses a finger to touch the touch-control conductor 14, the capacitance value of the touch-control conductor 14 is changed, and the touch-control IC 12 detects a difference in the capacitance value and transmits out a signal to achieve an effect of detection and thus controlling activation/deactivation and brightness of the luminous unit 13. Further, the injected encapsulation resin provides a function of protecting the touch-control IC 12 and the luminous unit 13, so that even in an operation of the high-temperature tin furnace in which the conductive material 15 (such as a conductive paste, such as silver paste or tin paste) is melted, the encapsulation resin may still be effective in combining the printed circuit board 11 and the touch-control conductor 14 together, making the two not shifting away. In one embodiment, the touch-control IC 12 and/or the luminous unit 13 further made an electrical connection with the touch-control conductor 14.

Figure 3A:
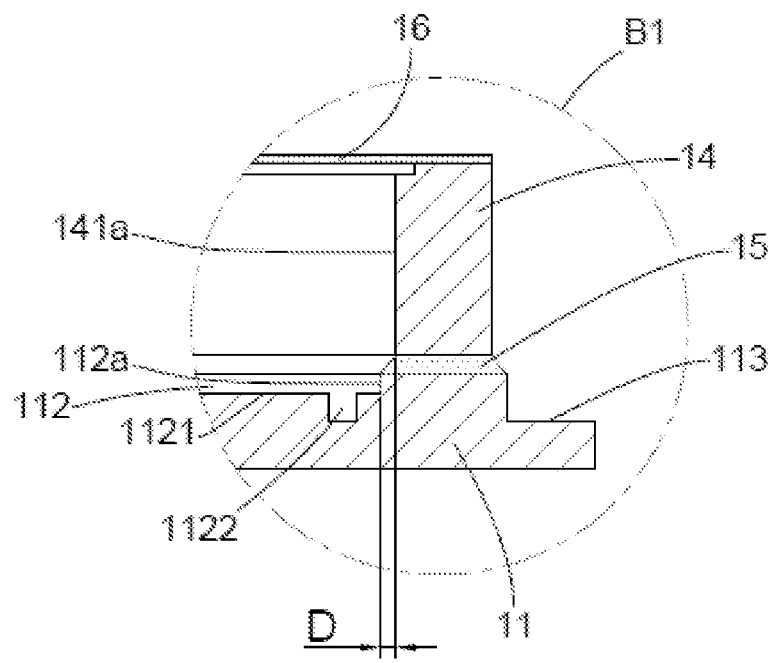
FIG. 3A is a cross-sectional view showing a portion of a touch light-emitting module of the present invention according to a first implementation example.
Figure 3B:
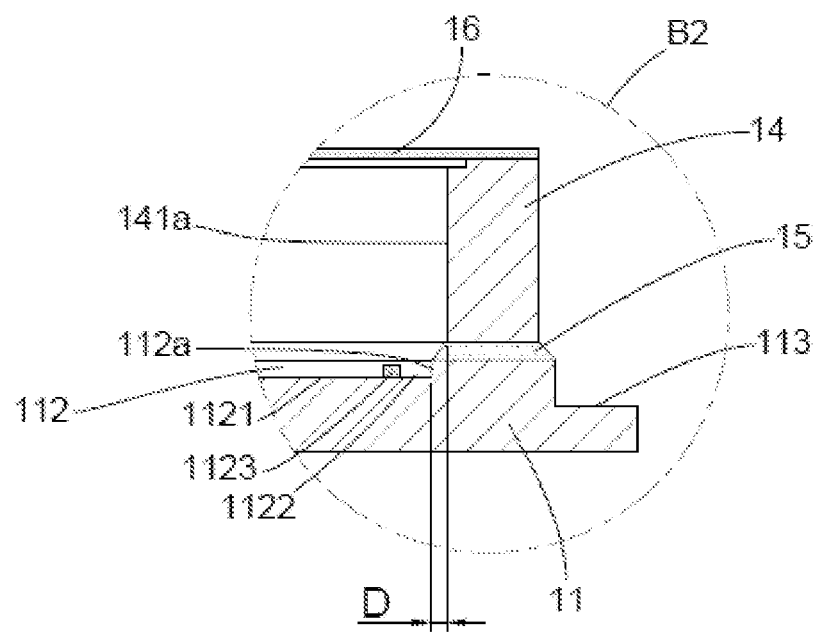
FIG. 3B is a cross-sectional view showing a portion of a touch light-emitting module of the present invention according to a second implementation example.

Further, the top surface 111 of the printed circuit board 11 is formed with a recessed portion 112, and the recessed portion 112 corresponds, in shape, to the hollowed portion 141, and the touch-control IC 12 and the luminous unit 13 are arranged in the recessed portion 112; the recessed portion 112 comprises a function zone 1121 in which the touch-control IC 12 and the luminous unit 13 are disposed of and a circumferential groove 1122 surrounding an outer circumference of the function zone 1121. In addition to what is shown in FIG. 3A, in which the circumferential groove 1122 is directly arranged around the outer circumference of the function zone 1121, is also possible, as shown in FIG. 3B, to arrange a raised rib 1123 directly around the outer circumference of the function zone 1121, so that the raised rib 1123 forms, in combination with a sidewall 112a of the recessed portion 112, the circumferential groove 1122 therebetween, in order to prevent impurities, such as soldering flux or soldering paste, from flowing into the function zone 1121.

Figure 3C:
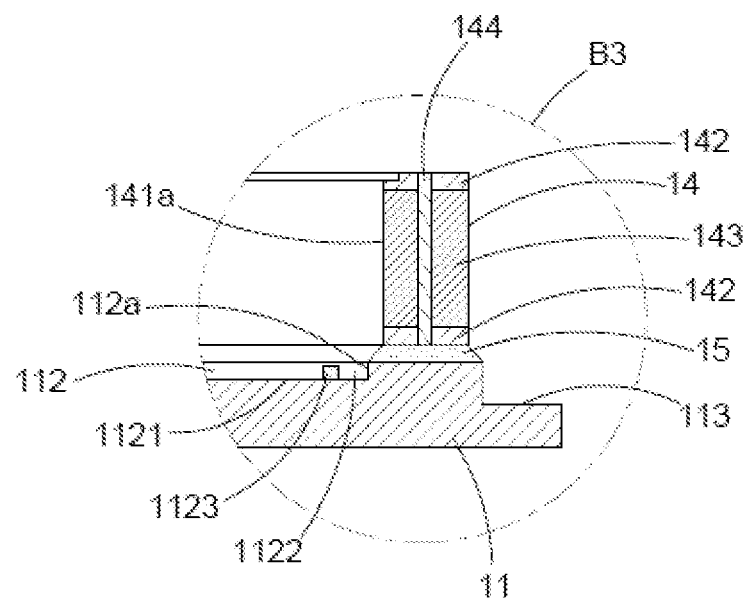
FIG. 3C is a cross-sectional view showing a portion of a touch light-emitting module of the present invention according to a third implementation example.

Preferably, as shown in FIG. 3C, the touch-control conductor 14 is formed by alternately stacking a plurality of copper-foil layers 142 and at least one insulator layer 143, and the touch-control conductor 14 comprises an electrically conductive body 144, such that the electrically conductive body 144 connects, in a direction of the stacking, at least two of the copper-foil layers 142 and the insulator layer 143 between the copper-foil layers 142 to establish electrical connection between the copper-foil layers 142. The alternately stacked arrangement of the copper-foil layers 142 and the insulator layer 143 helps increase the total surface area of the copper-foil layers 142 to improve the sensitivity of detection, wherein the numbers of the layers of the copper-foil layers 142 and the insulator layer 143 are not limited to any specific numbers. More specifically, the electrically conductive body 144 can be provided as multiple ones, and the electrically conductive body 144 connects different layers of the copper-foil layers 142. For example, the electrically conductive body 144 may be arranged to extend from a topmost one of the copper-foil layers 142 to a bottommost one of the copper-foil layers 142, to have all of the copper-foil layers 142 electrically connect to one another; or, according to a practical requirement for application, the electrically conductive body 144 may just connect two or more than two of the copper-foil layers 142, to have such copper-foil layers 142 electrically connect to the each other.

Further, as shown in FIGS. 1C and 1D, the touch-control conductor 14 comprises a plurality of electrically conductive zones 14a (the number of the electrically conductive zones 14a is not limited), and the electrically conductive zones 14a are combined using the conductive material 15 to the printed circuit board 11, and further, the electrically conductive zones 14a are not in contact with each other, so that accuracy of detection of a direction of touch by a user can be improved. Oppositely, in case the electrically conductive zones 14a are made a connection with each other, then it is hard to determine the direction of touch made by the user. FIGS. 1C and 1D show two different examples of implementation of the electrically conductive zones 14a. In FIG. 1C, the electrically conductive zones 14a are each formed by alternately stacking copper-foil layers 142 and at least one insulator layer 143, and further referring to FIG. 3C, the electrically conductive zones 14a are formed by alternately stacking a plurality of copper-foil layers 142 and at least one insulator layer 143, and the electrically conductive zones 14a are each provided with an electrically conductive body 144, such that the electrically conductive body 144 connects, in a direction of the stacking, at least two of the copper-foil layers 142 and the insulator layer 143 between the copper-foil layers 142 to establish electrical connection between the copper-foil layers 142. In this way, in addition to the accuracy of detection of a direction of touch by a user being improved, the sensitivity of detection can also be improved. In FIG. 1D, the electrically conductive zones 14a are simply isolated to form separate individual bodies.

Figure 5A:
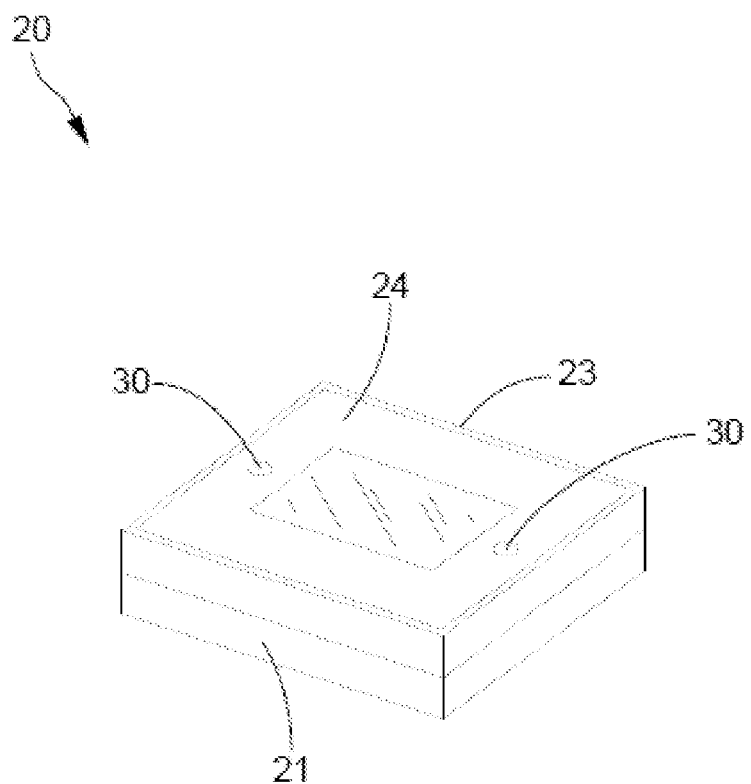
FIG. 5A is a perspective view showing a known product structure.
Figure 5B:
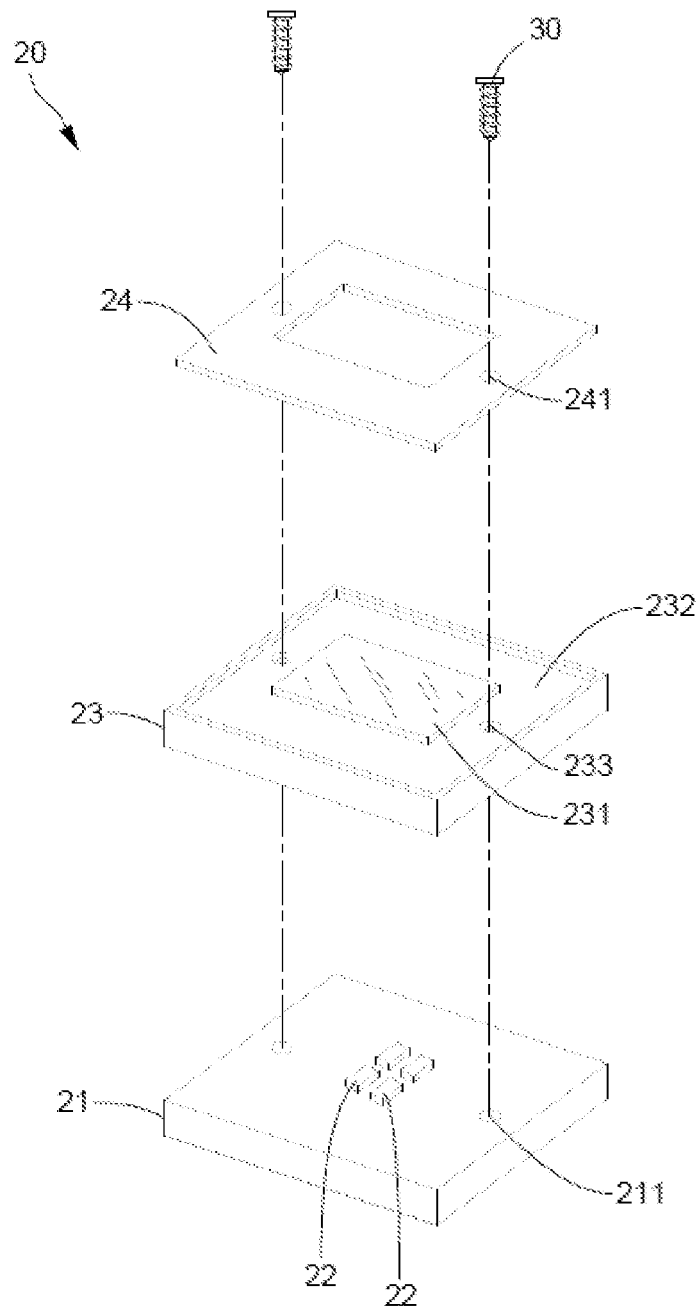
FIG. 5B is an exploded view showing the known product structure.

Further, in the touch light-emitting module 10 of the present invention, to prevent air voids or bubbles from remaining in the conductive material 15 in combining the touch-control conductor 14 with the printed circuit board 11, the touch-control conductor 14 is made with a size that is smaller than a size of the printed circuit board 11. Preferably, the touch-control conductor 14 and the printed circuit board 11 have a size difference therebetween smaller than 0.01-2 cm. The touch-control conductor 14 has a width that is around 0.3-2 cm. A projection area of the hollowed portion 141 is greater than a projection area of the recessed portion 112. Preferably, when the touch-control conductor 14 and the printed circuit board 11 are arranged in a co-axial manner, a spacing distance D that is around 0.05-0.5 mm is formed between the sidewall 112a of the recessed portion 112 and a sidewall 141a of the hollowed portion 141. All these, together with that the touch light-emitting module 10 is structured to have the touch-control conductor 14 and the printed circuit board 11 combined and fixed together using the conductive material 15 and the encapsulation resin, which make it possible to conduct an operation of fastening by using fasteners. Thus, compared to the known product structure 20 (as shown in FIGS. 5A and 5B), an effect of minimization can be realized.

Referring further to FIGS. 3A-3C, which are cross-sectional views each showing a portion "B" of the touch light-emitting module 10 according to the present invention shown in FIG. 2, these examples are different from the embodiment described above in that an outer flange of the printed circuit board 11 is formed as a stepped structure 113, by which burring caused by a subsequent operation of cutting can be effectively prevented, and further, a metallic pad 16 (which can be an electrically conductive metal, such as copper, silver, gold, and platinum) is arranged on the touch-control conductor 14 for a purpose of improving the sensitivity of detection of a touch made by a user. Thus, the metallic pad 16 may be arranged to have a side edge thereof flush with or in alignment with that of the touch-control conductor 14.

In addition, the previous embodiments may be further provided with a logic control IC (not shown) arranged on the top surface 111 of the printed circuit board 11, and the logic control IC is set in electrical connection with the touch-control IC 12 and the luminous unit 13 and is also encapsulated and thus protected by the encapsulation resin. In case the logic control IC is electrically connected with multiple ones of the luminous unit 13 of different light colors, in addition to touching the touch-control conductor 14 to control activation/deactivation and brightness of the luminous unit 13, a user may selectively make switching among various ones of the luminous unit 13 having different light colors in order to achieve an effect of creating different scenarios.

Figure 4:
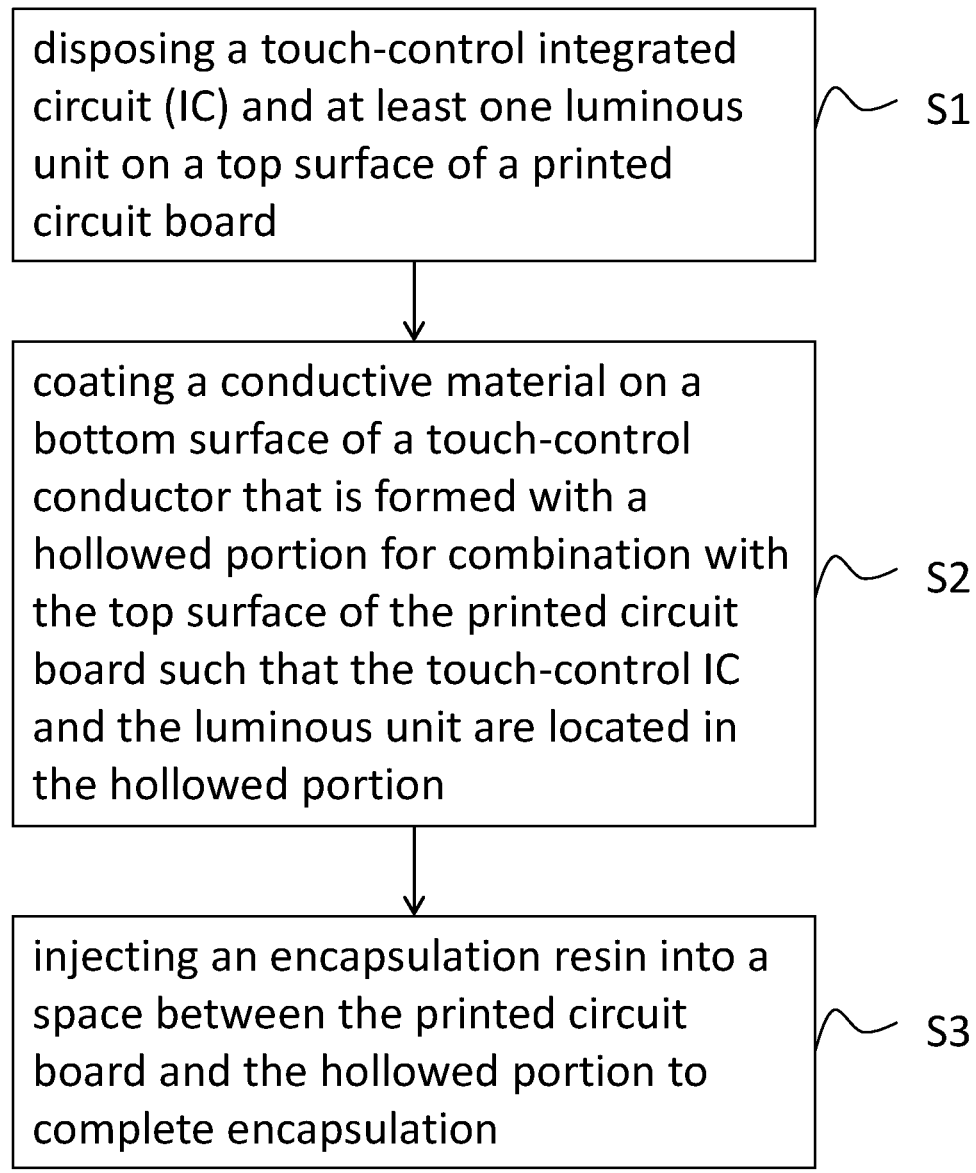
FIG. 4 is a flow chart illustrating a manufacturing process of a touch light-emitting module according to the present invention.

Finally, a reference is being made to FIG. 4 in combination with FIGS. 1A-3C, the present invention also provides a touch light-emitting module manufacturing method, which comprises: Step S1: disposing a touch-control IC 12 and at least one luminous unit 13 on a top surface 111 of a printed circuit board 11; Step S2: coating a conductive material 15 on a bottom surface of a touch-control conductor 14 that is formed with a hollowed portion 141 for combination with the top surface 111 of the printed circuit board 11 such that the touch-control IC 12 and the luminous unit 13 are located in the hollowed portion 141; and Step S3: injecting an encapsulation resin (not shown) into a space between the printed circuit board 11 and the hollowed portion 141 to complete encapsulation.

Specifically, in Step S1, the touch-control IC 12 and the luminous unit 13 are mounted on the top surface 111 of the printed circuit board 11 through a soldering and fixing operation; and in Step S2, the touch-control conductor 14 and the printed circuit board 11 are combined through an operation of reflow. Further, the touch light-emitting module 10 according to the present invention can be manufactured by setting multiple ones in one common mold for simultaneous fabrication, and thus, after completion of encapsulation implemented in Step S3, an additional step of cutting is required for cutting and separating each of the touch light-emitting modules 10, and also thus, with the outer flange of the printed circuit board 11 of the touch light-emitting module 10 being formed with a stepped structure 113, burring caused by such a cutting operation can be effectively avoided. Further, the size of the touch-control conductor 14 is smaller than that of the printed circuit board 11, wherein preferably, the size difference between the touch-control conductor 14 and the printed circuit board 11 is less than 0.01-2 cm, and the width of the touch-control conductor 14 is around 0.3-2 cm, and thus, in the manufacturing, the touch-control conductor 14 and the printed circuit board 11 can be combined and fixed together using the conductive material 15 and the encapsulation resin, so that there is no need to apply any fastener to fulfill fastening and fixing and thus, an operation of fastening can be saved and mass production can be realized. Therefore, compared to the fabrication of the known product structure 20 (as shown in FIGS. 5A and 5B), the touch light-emitting module 10 according to the present invention indeed simply the process of fabrication and reduce the working time.

Further, before the combination with the printed circuit board 11, the touch-control conductor 14 is formed by alternately stacking a plurality of copper-foil layers 142 and at least one insulator layer 143 and drilling is applied to at least two layers of the copper-foil layers 142 and the insulator layer 143 between the copper-foil layers 142 to make an electrical conduction hole (not shown), which is then filled up with electroplating to form an electrically conductive body 144 that electrically connects such copper-foil layers 142, so as to improve sensitivity of detection; or further, the touch-control conductor 14 comprises a plurality of electrically conductive zones 14a, and the conductive material 15 is coated on bottoms of the electrically conductive zones 14a, so that the electrically conductive zones 14a are combined with the printed circuit board 11 in a manner of being separated from each other to thereby enhance accuracy of detection of a direction of touch made by a user; however, preferably, the electrically conductive zones 14a are each formed by alternately stacking a plurality of copper-foil layers 142 and at least one insulator layer 143 and drilling is applied to at least two layers of the copper-foil layers 142 and the insulator layer 143 between the copper-foil layers 142 to make an electrical conduction hole (not shown), which is then filled up with electroplating to form an electrically conductive body 144 that electrically connects such copper-foil layers 142, so as to improve sensitivity of detection in addition to enhancing the accuracy of detection of a direction of touch made by a user.

Figure 6A:
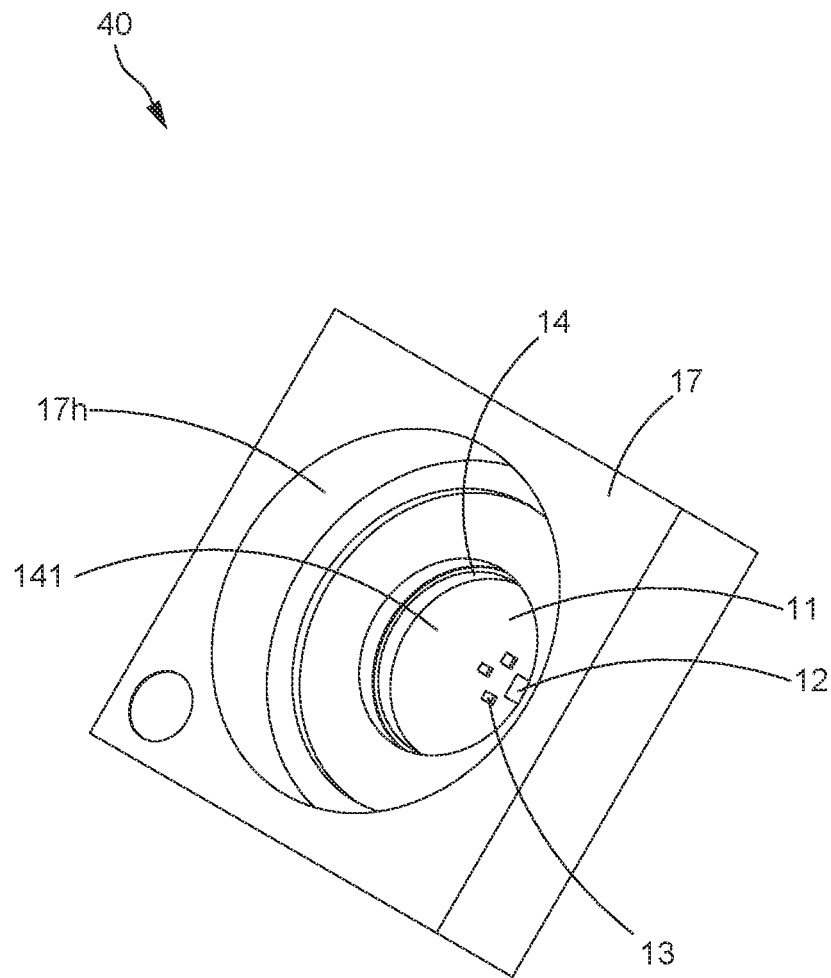
FIG. 6A is a perspective view showing a touch light-emitting module according to another embodiment of the present invention.
Figure 6B:
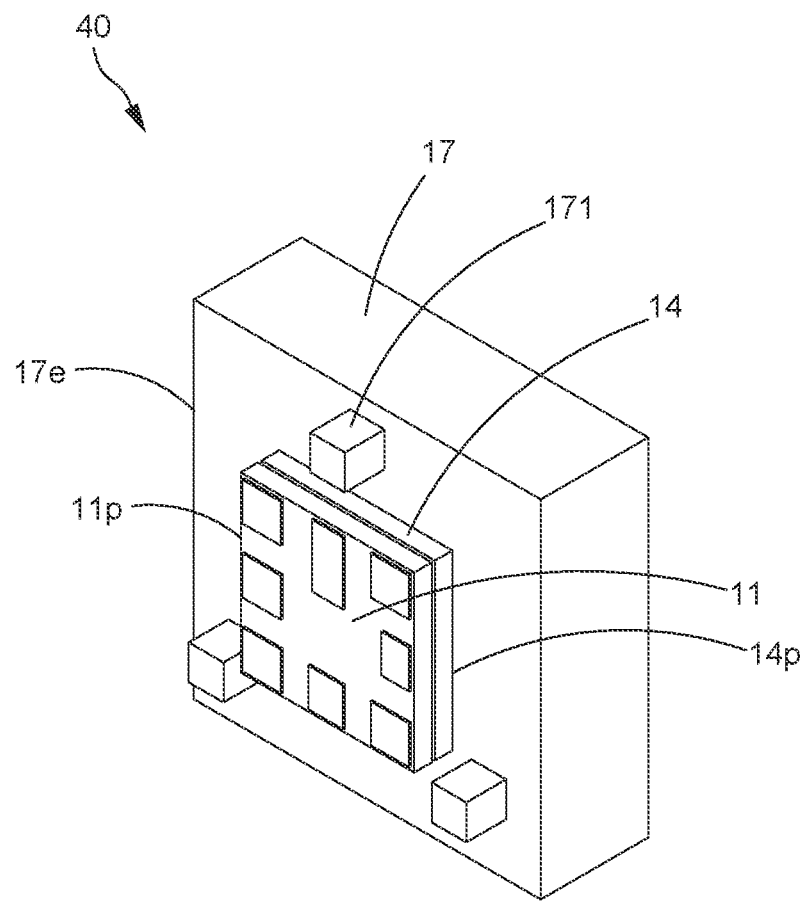
FIG. 6B is another perspective view of the touch light-emitting module shown in FIG. 6A.
Figure 6C:
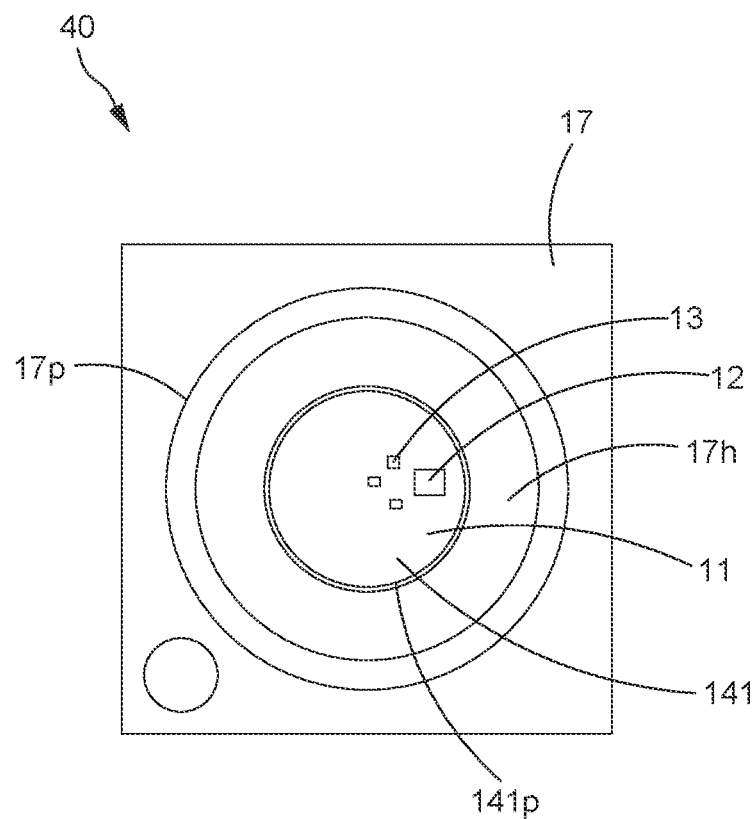
FIG. 6C is a top view of the touch light-emitting module shown in FIG. 6A.

In another implementation of present invention, an upper cover 17 can be assembled with the touch light-emitting module described in aforementioned embodiment. As shown in FIG. 6A and FIG. 6B, the upper cover 17 is mounted at the top of the touch-control conductor 14 to form the touch light-emitting module 40. The upper cover 17 is electrically connected with the touch-control conductor 14. As shown in FIG. 6B, the edges 17e of the upper cover 17 extend beyond the perimeter 14p of the touch-control conductor 14 and the perimeter 11p of the printed circuit board 11. The upper cover 17 is formed with a through-hole 17h. The through-hole 17h communicates with the hollowed portion 141 of the touch-control conductor 14 such that the light emitting from the luminous unit 13 can go through the hollowed portion 141 and the through-hole 17h and emitting out from the top of the touch light-emitting module 40. As shown in FIG. 6C, in top view of the touch light-emitting module 40, the perimeter 17p of the through-hole 17h encloses the perimeter 141p of the hollowed portion 141. Alternatively, the perimeter 17p of the through-hole 17h can overlap the perimeter 141p of hollowed portion 141. The preferred ratio of the length of the perimeter 17p of the through-hole 17h to the length of perimeter 141p of hollowed portion 141 ranges from 1.1 to 5 or 1.1 to 3. In this implementation, the light-emitting area of the touch light-emitting module 40 is enlarged by at least ten percent, which can increase the display area needed in final product, with even light distribution and without dark areas. The top portion of the upper cover 17 becomes an enlarged sensing area. This configuration can both increase the sensitivity of the touch light-emitting module 40 and reduce undesired operation due to the disturbance from signals existing in the environment. As an advantageous effect coming with this configuration, the size of the die-attach wiring layer on the printed circuit board 11 can be smaller, resulting in a lower cost. The bottom surface of the upper cover 17 is provided with copper-foil layers (not shown). Using manufacture process similar to the above-described, by applying solder paste on the copper-foil layers disposed on the bottom surface of the upper cover 17, mounting the upper cover 17 on the touch-control conductor 14 which has been disposed on the printed circuit board 11, and making the upper cover 17 and the touch-control conductor 14 combined through an operation of reflow, then injecting the encapsulation resin and applying a cutting step, single touch light-emitting module 40 can be manufactured.

In addition, as shown in FIG. 6B, the area of the bottom surface of the upper cover 17 where the upper cover 17 is not in contact with the touch conductor 14 can be provided with a plural of support members 171. In the process of mounting the upper cover 17 to the touch-control conductor 14, the support members 171 functions to stabilize the upper cover 17 to prevent the upper cover 17 from tilting, which can avoid a poor quality. The preferred number of the support members 171 is three.

Figure 7A:
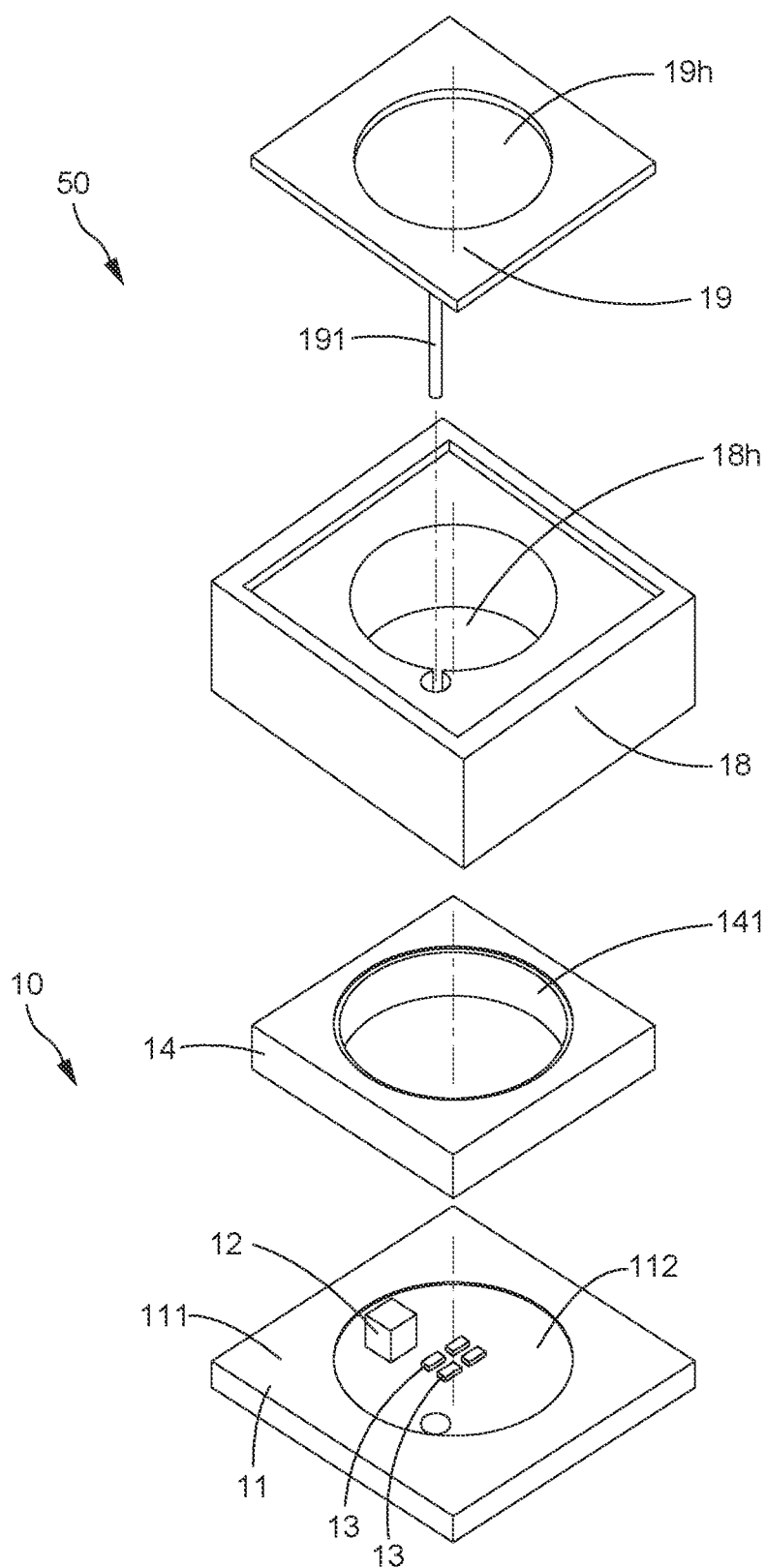
FIG. 7A is an exploded view showing a touch light-emitting module according to another embodiment of the present invention.
Figure 7B:
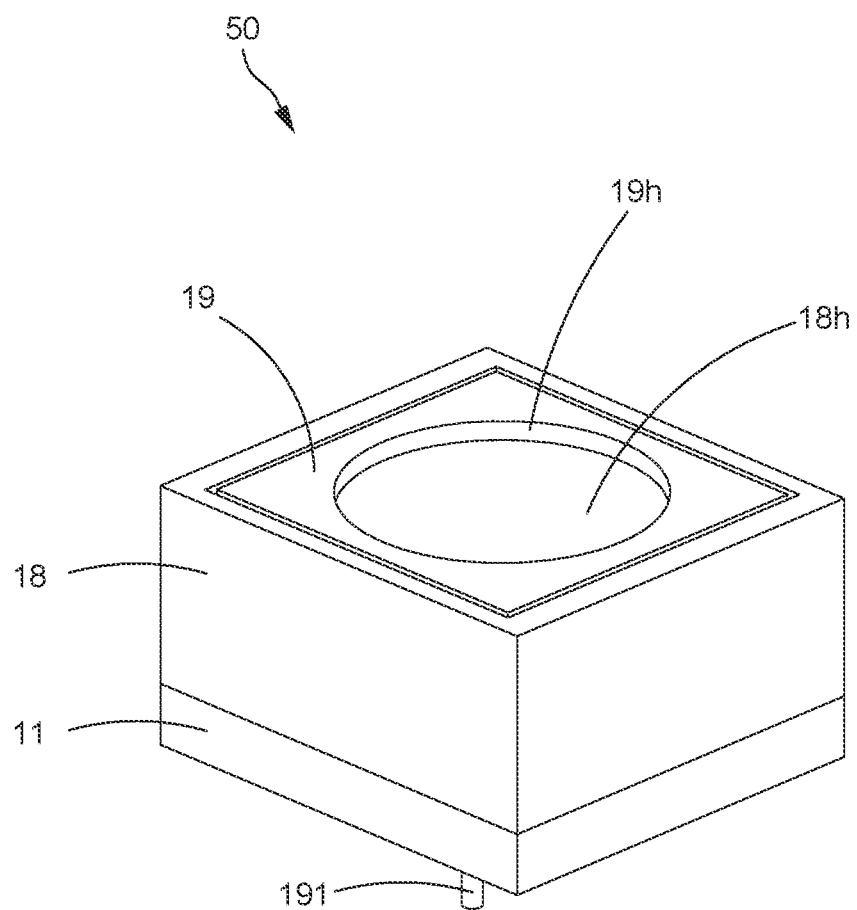
FIG. 7B is a perspective view of the touch light-emitting module shown in FIG. 7A.

As shown in FIG. 7A and FIG. 7B, in yet another implementation of present invention, the touch light-emitting module 10 can further comprises a reflector case 18 and a sensing electrode 19, to form the touch light-emitting module 50. The reflector case 18 is mounted on the printed circuit board 11 and cover the touch-control conductor 14. The sensing electrode 19 is mounted on the reflector case 18 and has a connecting portion 191. The connecting portion 191 can pierce through or not pierce through the printed circuit board 11. The connecting portion 191 is for electrically connecting with the main board of a apparatus or a device on which the touch light-emitting module 50 is intended to be installed. The reflector case 18 and the sensing electrode 19 have a through-hole respectively (through-hole 18h, 19h). The through-holes 18h, 19h communicate with each other and are arranged such that the light from the luminous unit 13 can pass therethrough and emit out from top of the touch light-emitting module 50. In this configuration, the signal generated when the touch-control conductor 14 is touched will be transmitted to the main board by the connecting portion 191 and the main board will, in response to receiving that signal, transmit another signal to the printed circuit board 11 and the touch-control IC 12 to control the luminous unit 13. The material of the sensing electrode 19 can be metal, single layer printed circuit board or multilayer printed circuit board.

Thus, the present invention provides a touch light-emitting module and a manufacturing method thereof, in which conductive material is applied to combine a touch-control conductor that is formed with a hollowed portion with a printed circuit board, such that the hollowed portion corresponds to a touch-control IC and a luminous unit disposed on the printed circuit board. After completion of encapsulation, when a finger of a user touches the touch-control conductor, the touch-control IC that detects a change of capacitance value generates and transmits out a signal to thereby control the luminous unit, and thus, compared to the known product structure, the touch light-emitting module according to the present invention involves fewer components so as to have a simple structure and does not require fastening and fixing by fasteners, and thus, an effect of minimization is realized and the manufacturing method indeed simplifies the process of production and reduces the working time to thereby improve the yield.

The description provided above is only concerned about the preferred embodiments of the present invention and is not intended to limit the scope of implementation of the present invention as defined in the claims. Equivalent alterations and modifications that are made according to the contents of the specification and the claims of the present invention should be considered equally falling in the scope of the present invention defined by the claims.

What is claimed is:

1. A touch light-emitting module, comprising:
a printed circuit board, the printed circuit board having a top surface on which a touch-control integrated circuit (IC) and at least one luminous unit in electrical connection with the touch-control IC are disposed; and
a touch-control conductor combined with the printed circuit board through a conductive material, the touch-control conductor being formed with a hollowed portion in which the touch-control IC and the luminous unit are located, the hollowed portion receiving an encapsulation resin to inject therein to form encapsulation of the touch light-emitting module;
wherein the touch-control conductor is formed of a plurality of copper-foil layers and at least one insulator layer that are alternately stacked on each other, and the touch-control conductor comprises an electrically conductive body, the electrically conductive body being arranged to connect, in a direction of the stacking, at least two of the copper-foil layers and the insulator layer between the copper-foil layers to establish electrical connection between the copper-foil layers.

2. The touch light-emitting module according to claim 1, wherein the top surface of the printed circuit board is formed with a recessed portion that corresponds, in shape, to the hollowed portion, and the touch-control IC and the luminous unit are disposed in the recessed portion.

3. The touch light-emitting module according to claim 2, wherein the recessed portion comprises a function zone on which the touch-control IC and the luminous unit are disposed and a circumferential groove that surrounds an outer circumference of the function zone.

4. The touch light-emitting module according to claim 3, wherein a raised rib is arranged between the function zone and the circumferential groove.

5. The touch light-emitting module according to claim 2, wherein the touch-control conductor and the printed circuit board are arranged coaxial with each other, and a spacing distance of around 0.05-0.5 mm is formed between a sidewall of the recessed portion and a sidewall of the hollowed portion.

6. The touch light-emitting module according to claim 1, wherein the touch-control conductor comprises a plurality of electrically conductive zones, and the electrically conductive zones are combined with the printed circuit board by the conductive material, the electrically conductive zones being in a state of non-contacting with each other.

7. The touch light-emitting module according to claim 6, wherein the electrically conductive zones are formed of the plurality of copper-foil layers and at least one insulator layer that are alternately stacked on each other, and the electrically conductive zones comprise the electrically conductive body.

8. The touch light-emitting module according to claim 1, wherein the touch-control conductor has a width of around 0.3-2 cm.

9. The touch light-emitting module according to claim 1, wherein the printed circuit board comprises an outer flange that is formed as a stepped structure.

10. The touch light-emitting module according to claim 1, wherein the top surface of the printed circuit board further comprises a logic control IC disposed thereon, and the logic control IC is in electrical connection with the touch-control IC and the luminous unit.

11. The touch light-emitting module according to claim 1, wherein a metallic pad is arranged on the touch-control conductor.

12. The touch light-emitting module according to claim 1, further comprising an upper cover, the upper cover being mounted at a top of the touch-control conductor and electrically connected with the touch-control conductor, edges of the upper cover extending beyond a perimeter of the touch-control conductor and a perimeter of the printed circuit board, the upper cover being formed with a through-hole, the through-hole communicating with the hollowed portion of the touch-control conductor, wherein in a top view of the touch light-emitting module, a perimeter of the through-hole enclosing a perimeter of the hollowed portion.

13. The touch light-emitting module according to claim 12, wherein an area of a bottom surface of the upper cover where the upper cover is not in contact with the touch conductor is provided with a plural of support members.

14. The touch light-emitting module according to claim 1, further comprising a reflector case and a sensing electrode, the reflector case being mounted on the printed circuit board and cover the touch-control conductor, the sensing electrode being mounted on the reflector case and having a connection portion, the reflector case and the sensing electrode respectively having a through-hole, the through-hole on the reflector case and the through-hole on the sensing electrode communicating with each other and being arranged such that the light from the luminous unit passes therethrough and emits out from a top of the touch light-emitting module.

15. A touch light-emitting module manufacturing method, comprising:
disposing a touch-control integrated circuit (IC) and at least one luminous unit on a top surface of a printed circuit board;
coating a conductive material on a bottom surface of a touch-control conductor that is formed with a hollowed portion for combination with the top surface of the printed circuit board such that the touch-control IC and the luminous unit are located in the hollowed portion; and
injecting an encapsulation resin into a space between the printed circuit board and the hollowed portion to complete encapsulation;
wherein the touch-control conductor is formed by alternately stacking a plurality of copper-foil layers and at least one insulator layer, and drilling is applied to at least two of the copper-foil layers and the insulator layer between the copper-foil layers to form an electrical conduction hole, which is then filled up with electroplating to form an electrically conductive body to electrically connect the copper-foil layers.

16. The touch light-emitting module manufacturing method according to claim 15, wherein the touch-control IC and the luminous unit are mounted on the top surface of the printed circuit board through a soldering operation, and the touch-control conductor and the printed circuit board are combined through an operation of reflow.

17. The touch light-emitting module manufacturing method according to claim 16, wherein the printed circuit board has a width of around 0.3-2 cm.

18. The touch light-emitting module manufacturing method according to claim 15, wherein the touch-control conductor comprises a plurality of electrically conductive zones, and the conductive material is coated on a bottom of the electrically conductive zones to have the electrically conductive zones combined with the printed circuit board in a state of non-contacting with each other.

* * * * *